Patented Oct. 17, 1944

2,360,685

UNITED STATES PATENT OFFICE 2,360,685

AZEOTROPIC DISTILLATION

Ernest Petersen Jensen, Belle, W. Va., assignor to E. I. du Pont de Nemours & Company, Wilmington, Del., a corporation of Delaware No Drawing. Application August 10, 1943, Serial No. 498,084

20 Claims. (Cl. 202—42)

This invention relates to a method for separating substances which boil closely together or form binaries such that separation cannot be achieved by simple fractional distillation. More particularly, this invention relates to the separation of hydrocarbons from mixtures of hydrocarbons and alcohols produced by hydrogenation of coconut oil.

It is an object of this invention to provide a method for separating closely boiling substances or substances which form azeotropes where separation by fractional distillation is difficult or impractical. It is a further object of the invention to provide a method for separating hydrocarbon impurities from alcohols containing 8 or more carbon atoms. A still further object of this invention is to remove hydrocarbon impurities from the alcohols obtained in the hydrogenation of coconut oil.

In accordance with this invention, those hydrocarbons produced as by-products or impurities in the hydrogenation of coconut oil to alcohols may be separated from the alcohols by addition to the mixture of alcohols and hydrocarbons of a glycol substance followed by distillation of the resulting azeotrope.

Some of the oils of the coconut oil group are Areca nut fat, Aouara kernal oil, babassu oil, cohune oil, coyal oil, Ouricury kernal oil, Maripa fat, palm kernal oil and tonka butter. These oils, upon hydrogenation, yield alcohols having 8 to 18 carbon atoms, and also hydrocarbons which may be formed by over-hydrogenation. In addition to these products the hydrogenation of these oils yields propylene glycol. However, in many instances, the amount of propylene glycol formed by the hydrogenation reaction is not sufficient to remove the hydrocarbon impurities from the alcohols by azeotropic distillation. Generally, what happens when the raw hydrogenated product is distilled is that first a low boiling cut including water comes over, then azeotropic mixtures containing propylene glycol. After the propylene glycol has thus been removed, hydrocarbon impurities and alcohols having 8 to 18 carbon atoms still remain in the residue. In accordance with this invention, fresh propylene glycol is added to the residue and hydrocarbon-propylene glycol azeotrope is distilled out, thus removing the hydrocarbon impurities. Other glycol substances, namely trimethylene glycol, ethylene glycol, 1,3-butylene glycol and the like could be used in place of propylene glycol, but I prefer to use propylene glycol because it is one of the products of coconut oil hydrogenation.

According to my preferred method, the mixture of alcohols having 8 to 18 carbon atoms per molecule, produced by hydrogenation of coconut oil, and containing as impurity hydrocarbons (dodecane, tetradecane and other similar normal aliphatic hydrocarbons) is treated with propylene glycol, and thereafter the hydrocarbons are distilled off as azeotropes with propylene glycol. The resulting azeotropes on condensation contain two phases, namely an upper hydrocarbon phase, and a lower propylene glycol phase. The lower propylene glycol phase is preferably drawn off and returned to the still kettle, the operations being continued in this manner until substantially all of the hydrocarbon impurity has been removed from the still-kettle contents. The distillation residue is then treated with water to remove propylene glycol.

When the propylene glycol is recovered and recycled in the above manner, a small amount of propylene glycol will suffice for removal of comparatively large amounts of hydrocarbon. If desired, very large amounts of glycol may be employed without deviating from the principle of this invention, since it is possible to remove any excess from the still-pot residue by extraction with water. However, I find it convenient to employ from 0.2 to 20 parts of glycol substance per part of hydrocarbon to be removed.

The following table gives the boiling points of certain azeotropes produced in accordance with this invention.

*Boiling points of azeotropes*

| Azeotrope components | Boiling points at various pressures | | | | |
|---|---|---|---|---|---|
| | Atmospheric | 200 mm. | 150 mm. | 100 mm. | 50 mm. |
| Propylene glycol-dodecane | 175° C. (743 mm.) | 137 | 130 | 120.5 | 105.7 |
| Propylene glycol-tetradecane | 179° C. (748 mm.) | 142.5 | 135 | 126 | 111 |
| Ethylene glycol-dodecane | 179° C. (748 mm.) | 142 | 135 | 125 | 110 |
| Ethylene glycol-tetradecane | 187.5° C. (748 mm.) | 150.5 | 142.5 | 133 | 118 |

The invention is further illustrated by the following examples, without being restricted thereto.

*Example 1.*—A sample of impure n-octanol, produced by fractionating coconut oil hydrogenation product, had a hydroxy number and a specific gravity such that the presence of hydrocarbon impurities was indicated. To 100 parts of this impure n-octanol was added 25 parts of propylene glycol, and the mixture was distilled at subatmospheric pressure. A binary azeotrope which contained 40 volume percent upper hydrocarbon layer and 60 volume percent lower propylene glycol layer distilled over at 120.5° C., 100 mm. After a sufficient amount of the azeotrope had been collected to permit satisfactory separation of the layers, the lower layer was drawn off and continuously returned to the still kettle at approximately the same rate at which the condensate was formed. The distillation was continued in this manner until substantially no more hydrocarbon was removed from the still-kettle contents. The recovered hydrocarbon, on redistillation, boiled at 145° C., 100 mm., which is the boiling point of dodecane. The distillation residue after being washed with water to remove propylene glycol, was purified by redistillation. It boiled at 135° C., 100 mm., which is the boiling point of n-octyl alcohol.

*Example 2.*—Example 1 was repeated, except that the distillations were all performed at atmospheric pressure. The boiling points observed were: propylene glycol-dodecane azeotrope, 175° C.; dodecane, 216° C.; and n-octyl alcohol, 195° C.

*Example 3.*—A mixture containing 2 parts of tetradecane, 5 parts of propylene glycol and 93 parts of n-decyl alcohol was distilled at subatmospheric pressure. A binary azeotrope which contained 30 volume percent upper tetradecane layer, and 70 volume percent lower propylene glycol layer was distilled, boiling at 114° C., 64 mm. Propylene glycol was thereafter washed from the still-kettle contents, and the distillation was resumed. N-decanol, substantially free of hydrocarbon was collected, boiling at 165° C., 100 mm.

*Example 4.*—A mixture of crude alcohols obtained by hydrogenation of coconut oil was distilled to remove foreshot which boiled at 70–230° C., at atmospheric pressure. To 100 parts of the resulting residue was added 10 parts of propylene glycol and the mixture was distilled at atmospheric pressure. A fraction which contained 30 volume percent upper hydrocarbon layer and 70 volume percent lower propylene glycol layer was collected, boiling at 171–173° C. The hydrocarbon layer was drawn off, and was redistilled, yielding pure tetradecane which boiled at 252.5° under atmospheric pressure. The propylene glycol layer was removed and distilled, yielding pure propylene glycol which boiled at 187° C. under atmospheric pressure.

While I have illustrated my invention by certain applications and examples, I do not limit my claims to such specific cases, for there are many problems of separation whose solutions may employ as a basic principle the separation of non-cyclic hydrocarbon from closely boiling alcohols having 8 or more carbon atoms per molecule, by azeotropic distillation of the hydrocarbon with a glycol substance. The method of this invention may be employed for the separation of the non-cyclic hydrocarbon impurities from the impure alcohols which are obtained by hydrogenation of coconut oil acids, such alcohols being similar to or identical with the alcohols, containing 8 or more carbon atoms, obtained by hydrogenation of coconut oil itself.

I claim:

1. A process for separating normal aliphatic hydrocarbons, having 12 to 14 carbon atoms per molecule, from mixture with normal aliphatic alcohols having 8 to 18 carbon atoms per molecule which comprises introducing into the hydrocarbon-alcohol mixture a glycol selected from the class consisting of propylene glycol, trimethylene glycol, ethylene glycol and 1,3-butylene glycol, in quantity equivalent to from 0.2 to 20 parts per part of hydrocarbon in the mixture, distilling off an azeotrope of the hydrocarbon and glycol, recovering the hydrocarbon and glycol from the azeotrope, washing the distillation residue to remove glycol therefrom, and purifying the residual alcohols by distillation.

2. In a process for manufacturing products of increased alcohol content from mixtures containing non-cyclic hydrocarbons, and non-cyclic alcohols having 8 to 18 carbon atoms per molecule, such alcohols being difficult or impractical to separate from the admixed hydrocarbon by fractional distillation, the steps which comprise introducing a glycol selected from the class consisting of propylene glycol, trimethylene glycol, ethylene glycol and 1,3-butylene glycol, into the mixture, distilling off an azeotrope of the hydrocarbon and glycol, and treating the distillation residue with water to free it of the glycol.

3. In a process for removing hydrocarbons from alcohol-containing products obtained by hydrogenation of coconut oil, the steps which comprise introducing propylene glycol into the hydrocarbon-alcohol mixture, and distilling off an azeotropic mixture containing propylene glycol and hydrocarbon.

4. In a process for separating hydrocarbons from alcohols having 8 or more carbon atoms, such hydrocarbons being difficult to separate by fractional distillation from alcohols having 8 to 10 carbon atoms per molecule, the steps which comprise introducing propylene glycol into the hydrocarbon-alcohol mixture, distilling off a hydrocarbon-propylene glycol azeotrope, washing the distillation residue with water to remove propylene glycol therefrom and purifying the residual alcohols by distillation.

5. In a process for separating hydrocarbons from alcohols having 8 or more carbon atoms, such hydrocarbons being difficult to separate by fractional distillation from alcohols having 8 to 10 carbon atoms per molecule, the steps which comprise introducing propylene glycol into the hydrocarbon-alcohol mixture, and distilling off a hydrocarbon-propylene glycol azeotrope.

6. In a process for manufacturing products of increased alcohol content from mixtures containing non-cyclic hydrocarbon, and non-cyclic alcohols having 8 to 10 carbon atoms per molecule, such alcohols being difficult or impractical to separate from the admixed hydrocarbon by fractional distillation, the steps which comprise introducing propylene glycol into the mixture, distilling off an azeotrope of propylene glycol and hydrocarbon, and treating the distillation residue with water to remove propylene glycol therefrom.

7. A process for separating normal aliphatic hydrocarbons, having from 12 to 14 carbon atoms per molecule, from normal aliphatic alcohols having from 8 to 18 carbon atoms per molecule which comprises introducing into such hydrocarbon-alcohol mixture propylene glycol in quantity equivalent to from 0.2 to 20 parts per part of the hydrocarbon, distilling off an azeotrope of hydrocarbon and propylene glycol, recovering the hydrocarbon and propylene glycol from the azeotrope, washing the distillation residue with water to remove propylene glycol therefrom, and purifying the residual alcohols by distillation.

8. A process for separating normal aliphatic hydrocarbons, having from 12 to 14 carbon atoms per molecule, from admixture with alcohols having 8 or more carbon atoms per molecule which comprises introducing into such hydrocarbon-containing mixture propylene glycol in quantity equivalent to from 0.2 to 20 parts per part of the hydrocarbon, distilling off an azeotrope of hydrocarbon and propylene glycol, recovering the hydrocarbon and propylene glycol from the azeotrope, and washing the distillation residue with water to remove propylene glycol therefrom.

9. A process for separating normal aliphatic hydrocarbons, having 12 to 14 carbon atoms per molecule, from normal aliphatic alcohols having 8 to 18 carbon atoms per molecule which comprises introducing propylene glycol into such hydrocarbon-alcohol mixture, distilling off an azeotrope of hydrocarbon and propylene glycol, recovering the hydrocarbon and propylene glycol from the azeotrope, washing the distillation residue with water to remove propylene glycol therefrom, and purifying the residual alcohols by distillation.

10. A process for separating normal aliphatic hydrocarbons, having 12 to 14 carbon atoms per molecule, from normal aliphatic alcohols having 8 to 18 carbon atoms per molecule which comprises introducing into such hydrocarbon-alcohol mixture propylene glycol in quantity equivalent to from 0.2 to 20 parts per part of hydrocarbon in the mixture, distilling off an azeotrope of hydrocarbon and propylene glycol, and recovering the hydrocarbon and propylene glycol from the azeotrope.

11. A process for removing normal aliphatic hydrocarbons, having 12 to 14 carbon atoms per molecule, from admixture with normal aliphatic alcohols having 8 to 18 carbon atoms per molecule, the step which comprises introducing into such hydrocarbon-alcohol mixture propylene glycol in quantity equivalent to from 0.2 to 20 parts per part of hydrocarbon in the mixture, and distilling off an azeotrope of hydrocarbon and propylene glycol.

12. A process for manufacturing products of increased alcohol content from mixtures containing non-cyclic hydrocarbons and non-cyclic alcohols having 8 to 18 carbon atoms per molecule, such alcohols being difficult or impractical to separate from the hydrocarbons by fractional distillation, the steps which comprise introducing into the mixture 0.2 to 20 parts of propylene glycol per part of hydrocarbon present, distilling off an azeotrope of hydrocarbon and propylene glycol, recovering the hydrocarbon and propylene glycol from the azeotrope, washing the distillation residue with water to remove propylene glycol therefrom and distilling the residual alcohols.

13. In a process for manufacturing products of increased alcohol content from mixtures containing non-cyclic hydrocarbon, and non-cyclic alcohols having 8 to 18 carbon atoms per molecule, such alcohols being difficult or impractical to separate from the admixed hydrocarbon by fractional distillation, the steps which comprise introducing into the mixture 0.2 to 20 parts of propylene glycol per part of hydrocarbon present, and distilling off an azeotrope of propylene glycol and the hydrocarbon.

14. In a process for separating dodecane from mixtures containing dodecane and n-octyl alcohol, the steps which comprise effecting a ratio of 0.2 to 20 parts of propylene glycol per part of dodecane, distilling off an azeotrope of dodecane and propylene glycol, recovering propylene glycol and dodecane from the azeotrope, and treating the distillation residue with water to free it of propylene glycol.

15. In a process for separating dodecane from mixtures containing dodecane and n-octyl alcohol the steps which comprise introducing propylene glycol into the mixture and distilling off a dodecane-propylene glycol azeotrope.

16. A process for separating dodecane from mixture with alcohols having 8 or more carbon atoms per molecule which comprises introducing propylene glycol with the mixture and distilling off a propylene glycol-dodecane azeotrope.

17. In a process for separating tetradecane from mixtures containing tetradecane and n-decyl alcohol, the steps which comprise effecting a ratio of 0.2 to 20 parts of propylene glycol per part of tetradecane, distilling off an azeotrope of tetradecane and n-decyl alcohol, recovering tetradecane and propylene glycol from the azeotrope, and treating the distillation residue with water to free it of propylene glycol.

18. In a process for separating tetradecane from mixtures containing tetradecane and n-decyl alcohol, the steps which comprise introducing propylene glycol into the mixture, and distilling off a tetradecane-propylene glycol azeotrope.

19. A process for separating tetradecane from mixture with alcohols having 8 or more carbon atoms per molecules which comprises introducing propylene glycol with the mixture and distilling off a propylene glycol-tetradecane azeotrope.

20. A process for separation of hydrocarbons from mixture with alcohol-containing products obtained by hydrogenation of coconut oil acids, the steps which comprise introducing propylene glycol with the mixture distilling off propylene glycol-hydrocarbon azeotrope, and recovering the hydrocarbon from the upper layer of the azeotrope.

ERNEST P. JENSEN.